(12) United States Patent
Cerutti et al.

(10) Patent No.: US 6,889,814 B2
(45) Date of Patent: May 10, 2005

(54) ARTICLE SORTATION SYSTEM

(75) Inventors: Claudio A. Cerutti, Borgomanero (IT);
Artemio G. Affaticati, Cadeo (IT);
Stuart M. Edwards, Cernusco S/N (IT)

(73) Assignee: Rapistan Systems Advertising Corp.,
Grand Rapids, MI (US)

( * ) Notice: Subject to any disclaimer, the term of this patent is extended or adjusted under 35 U.S.C. 154(b) by 173 days.

(21) Appl. No.: 10/067,599

(22) Filed: Feb. 4, 2002

(65) Prior Publication Data

US 2002/0179502 A1 Dec. 5, 2002

Related U.S. Application Data

(60) Provisional application No. 60/294,315, filed on May 30, 2001.

(51) Int. Cl.[7] .............................................. B65G 47/00
(52) U.S. Cl. .................................. 198/358; 198/370.06
(58) Field of Search ............................ 198/358, 370.06, 198/357; 209/922, 934

(56) References Cited

U.S. PATENT DOCUMENTS

| | | | |
|---|---|---|---|
| 3,254,752 A | | 6/1966 | Bauch et al. |
| 3,550,748 A | | 12/1970 | Hauer |
| 3,752,312 A | | 8/1973 | Soltanoff |
| 3,848,728 A | | 11/1974 | Leibrick et al. |
| 3,905,491 A | * | 9/1975 | Harrison .................. 198/349.8 |
| 4,244,672 A | * | 1/1981 | Lund .......................... 198/350 |
| 4,781,281 A | | 11/1988 | Canziani |
| 4,915,209 A | | 4/1990 | Canziani |
| 5,038,911 A | * | 8/1991 | Doane et al. ............... 198/357 |
| 5,547,084 A | | 8/1996 | Okada et al. |
| 5,588,520 A | | 12/1996 | Affaticati et al. |
| 5,868,238 A | | 2/1999 | Bonnet |
| 5,901,830 A | | 5/1999 | Kalm et al. |
| 6,209,703 B1 | | 4/2001 | Soldavini |
| 6,253,901 B1 | | 7/2001 | Hintz et al. |
| 6,253,904 B1 | | 7/2001 | Soldavini |
| 6,499,604 B1 | | 12/2002 | Kitson ........................ 209/630 |

FOREIGN PATENT DOCUMENTS

| | | | | |
|---|---|---|---|---|
| DE | 2717199 A1 | 11/1978 | .......... | B65G/47/34 |
| DE | 4033699 C1 | 12/1991 | .......... | B65G/47/52 |
| EP | 481341 A1 | 4/1992 | .......... | B65G/43/00 |
| EP | 518180 A2 | 12/1992 | .......... | B65H/31/18 |
| EP | 556866 A2 | 8/1993 | ............ | B07C/5/36 |
| EP | 774429 A1 | 5/1997 | .......... | B65G/47/46 |
| EP | 927689 A1 | 7/1999 | .......... | B65G/17/34 |
| FR | 2450765 | 10/1980 | .......... | B65G/47/52 |
| JP | 6127662 | 5/1994 | .......... | B65G/43/08 |
| WO | 0032502 | 6/2000 | | |

OTHER PUBLICATIONS

Commonly assigned, co-pending U.S. Appl. No. 09/669,170 filed Sep. 25, 2000 by Artemio G. Affaticati and Claudio A. Cerutti.

Commonly assigned, co-pending U.S. Appl. No. 09/675,237, filed Sep. 29, 2000 by Edwards et al.

* cited by examiner

Primary Examiner—Donald P. Walsh
Assistant Examiner—Joseph C Rodriguez
(74) Attorney, Agent, or Firm—Van Dyke, Gardner, Linn & Burkhart, LLP

(57) ABSTRACT

An article sortation system includes a plurality of transport units which are movable along a conveying path between induction stations and discharge stations along each side of the conveying path. Each transport unit has side by side loading and support capability and is operable to receive packages from induction stations and discharge the packages at an appropriate discharge station. The system includes a control which determines the destination of articles and resolves blocking conditions between articles at the induction stations or at the transport units. The system may include a reinduction station for receiving an article from a transport unit and reinducting the article onto a transport unit, in order to resolve a blocking condition between a pair of articles on the respective transport unit.

25 Claims, 9 Drawing Sheets

ARTICLE SORTATION SYSTEM

CROSS-REFERENCE TO RELATED APPLICATION

The present application claims priority from U.S. provisional application Ser. No. 60/294,315, filed May 30, 2001 by Stuart M. Edwards et al. for ARTICLE SORTATION SYSTEM, which is hereby incorporated herein by reference in its entirety.

FIELD OF THE INVENTION

The present invention relates generally to parcel sortation systems and, more particularly, to parcel sortation systems which support parcels or articles on transport units which are operable to discharge the parcels from the transport units to selected receiving ports. The transport units are movable along a conveying path and include a pair of carrying means for carrying side by side articles. Preferably, such carrying means includes side by side article supports, such as carrier belts or tilt trays or the like, which are independently operable to receive parcels or articles from induction ports or stations and to discharge the articles to the selected destination ports along either side of the conveying path. However, the invention could be applied to carrying means that position side by side articles on a unitary article support, carrier belt or the like.

BACKGROUND OF THE INVENTION

Article sortation systems are known and include a plurality of transport units which are movable along a conveying path between a package induct station and a discharge station or port. Some article sortation systems, known as carousel sorters, travel in a generally horizontal closed circuit. Some carousel sorters include crossbelt transport units, which are able to handle parcels of widely varying characteristics. For example, such systems may be used to sort magazines or envelopes at a postal center, frozen food articles, cellophane wrapped clothing articles, or the like. The crossbelt sortation systems are widely adaptable because the parcels are loaded onto article supports or carrier belts of the transport units. The carrier belts are movable generally perpendicular to the conveying path of the transport units, and the parcels are discharged from the units via movement of the carrier belts, after the transport unit has carried the parcel to the appropriate destination along the conveying path. Another example of carousel sorters include tilt tray sorters.

Parcels may be inducted to the transport units at various separate locations using a plurality of induction stations. However, only one package may be inducted from a given induction station onto a given transport unit at any time. If multiple induction stations are implemented, the throughput of the system may not be significantly enhanced unless one or more discharge stations are positioned between the induction stations to allow at least some of the transport units to empty their packages before arriving at the second induction station. Otherwise, a package may remain on a transport unit as it passes the second induction station, thereby precluding the transport unit from receiving another package at the second induction station.

Some crossbelt conveyor units can receive two packages on the belt of the conveyor unit. The objects, or packages, may then be discharged at appropriate stations. However, in order to properly position the packages at the appropriate side of the conveyor units, the packages need to be properly arranged and sequenced prior to being inducted onto the conveyor units. This requires an additional process of pre-sorting the packages, which reduces the efficiency of the crossbelt sortation system.

SUMMARY OF THE INVENTION

The present invention is intended to provide a dual support sortation system which has a plurality of sorter or transport units which are movable along a conveying path. Each transport unit has side by side support capability and may include a pair of article supports, such as movable carrier belts, tilt trays or the like, which are independently operable to receive an article from an induction station, transfer an article to the other support of the transport unit, and/or discharge an article at an appropriate discharge station. Optionally, the article supports are carrier belts, which are longitudinally aligned on the sorter unit and are movable in a direction generally transverse to the conveying path. The sortation system identifies the articles at the induction stations and/or the transport units and is operable to sort or sequence the loading and/or unloading of the articles in order to limit recirculation of the articles around the conveying path. The present invention thus provides significantly improved efficiency and throughput of the sortation system, without the need to presort the articles or packages at the induction station or stations.

According to one aspect of the present invention, an article sortation system or method for inducting articles includes a plurality of transport units having side by side article support capability and being movable along a continuous conveying path. The system or method includes at least one induct for loading articles onto the transport units, and a control which is operable to determine a destination of the articles, to load articles from the induct to the transport units, and to resolve at least partial blocking conditions between the articles. The induct receives articles without respect to a destination of the articles and is operable to move the articles toward the transport units in the order in which the articles are received by the induct. The at least partial blocking conditions include an interference between two articles based on the destination of the two articles and the side of the conveying path or transport unit at which the two articles are positioned.

In one form, the system includes at least two inducts for loading articles onto transport units from opposite sides of the conveying path. Optionally, the system may include at least one reinduction station positioned along at least one side of the conveying path. The reinduction station is operable to receive articles from the transport units and to reinduct the articles onto transport units moving along the conveying path.

The control may be operable to load or delay loading of articles in response to the destination and the blocking conditions of the articles, in order to limit unloading of either the articles remote from their respective destinations and/or to limit recirculation of the articles around the conveying path.

Therefore, the sortation system effectively sorts the articles by selecting an appropriate one of a plurality of transport units for articles at induction stations along one or both sides of the conveying path and determining whether the articles or packages are to be unloaded, transferred, reinducted or rejected in response to the destination of the article or articles and the desired mode or result of the sortation system. The present invention provides an article sortation system which is operable to load parcels or articles onto transport units having side by side article support capability from the induction station. The transport units of the sortation system thus may receive packages at, transfer packages to, and/or discharge packages from either side of the transport units and the conveying path of the sortation system. The present invention thus provides improved throughput and a reduced amount of manual processes over the sorting systems of the prior art.

DESCRIPTION OF THE PREFERRED EMBODIMENTS

Figure 1:
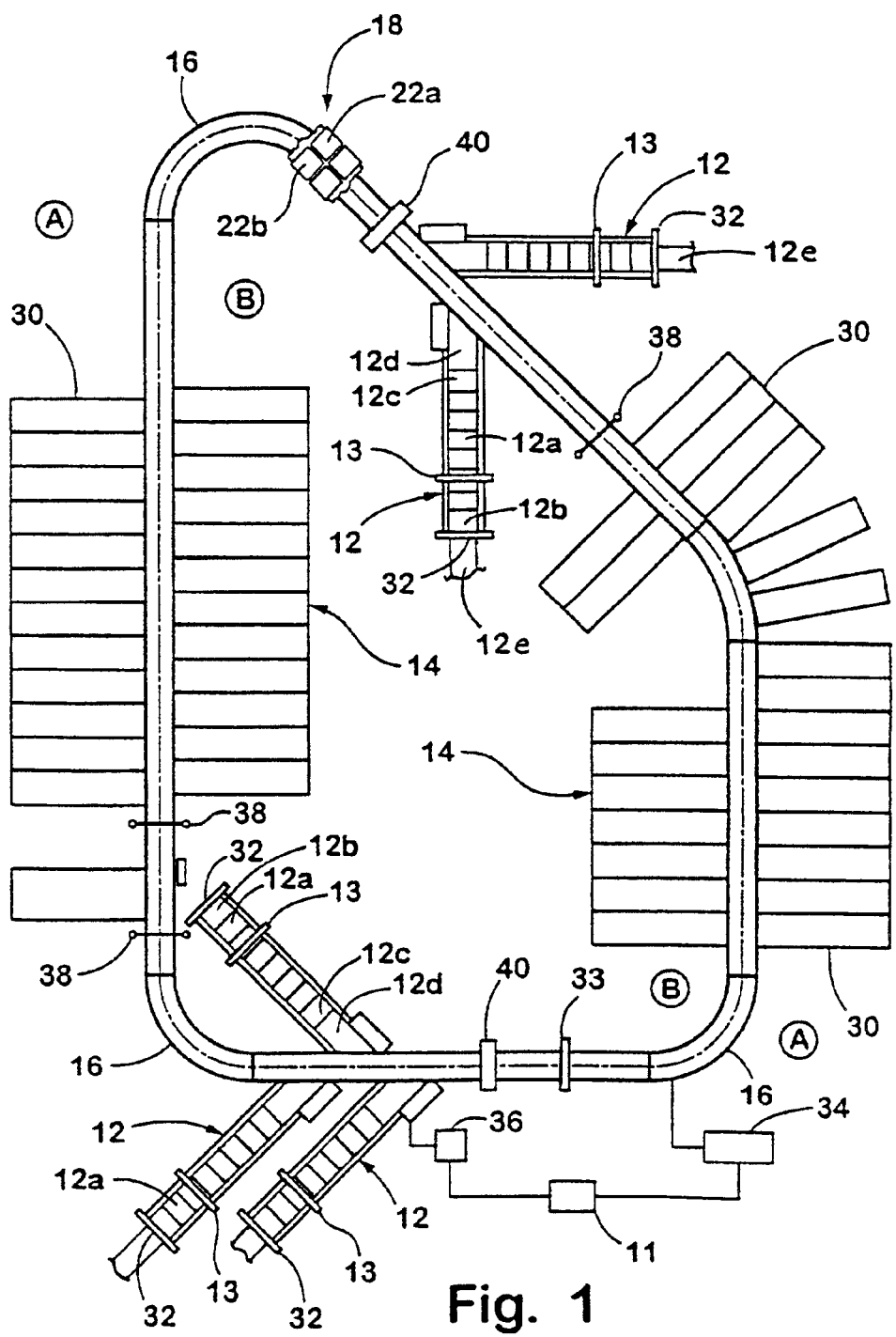
FIG. 1 is a top plan view of the sortation system of the present invention.

Referring now specifically to the drawings and the illustrative embodiments depicted therein, an article sortation system 10 includes one or more article induction stations 12 and one or more discharge stations 14 interconnected by a continuous conveying path 16 (FIG. 1). A plurality of transport units 18 move continuously along conveying or guide path 16 to transport articles, such as parcels, packages, boxes, and/or the like, between the induction stations 12 and discharge stations 14. The sortation system 10 is operable via one or more sortation algorithms or processes, such as processes 100, 300 and/or 500 (FIGS. 6–8), to load and unload parcels or articles at either side A or B of the conveying path 16 in an efficient manner without presorting of the articles to specific inducts and with minimal recirculation or reloading, depending on the application, as discussed below. The processes load, move and/or unload the articles in response to a blocking condition, such as no blocking, partial blocking or full or complete blocking, between two articles at opposite induction stations or at opposite cells or sides of a transport unit, as also discussed below.

Figure 3:
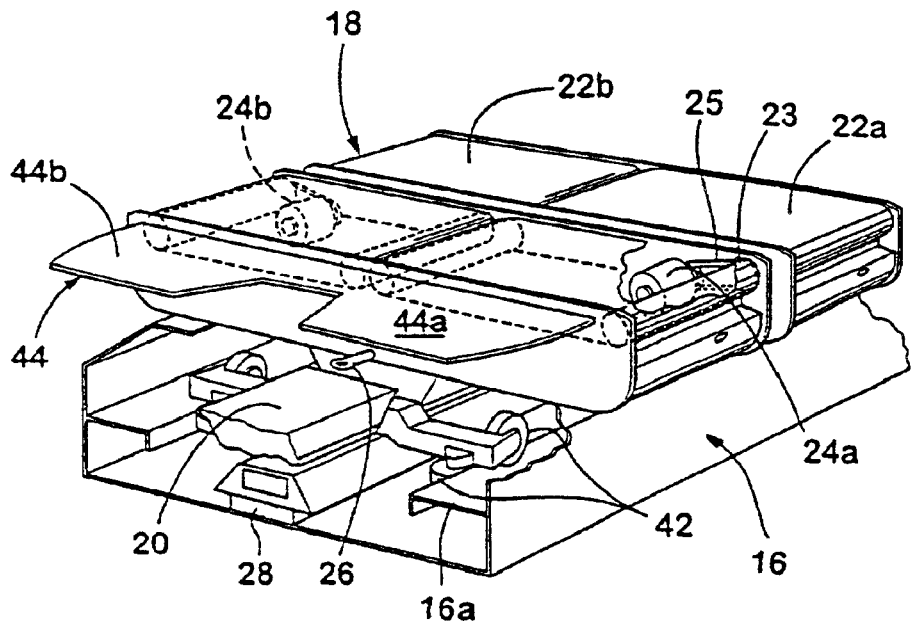
FIG. 3 is a perspective view of the dual carrier-belt transport units in accordance with the present invention, with a portion of the rails cut away.

Transport units 18 may be substantially similar to the transport units disclosed in commonly assigned U.S. patent application, Ser. No. 09/675,237, filed Sep. 29, 2000 by Edwards et al., for DOUBLE WIDTH CROSSBELT SORTER, now U.S. Pat. No. 6,478,138, the disclosure of which is hereby incorporated herein by reference. However, the transport units may also be of the type disclosed in International Publication No. WO 00/32502, published Jun. 8, 2000 for A CONVEYOR/SORTER SYSTEM, A LOADING CONVEYOR AND A CONTROL SYSTEM FOR SUCH CONVEYORS; European Pat. Application, published Jan. 11, 1995 as Publication No. EP 0 633 208 A1 for ARTICLE SORTING METHOD AND SYSTEM; and/or European Pat. Application, published Jul. 7, 1999 as Publication No. EP 0 927 689 A1 for METHOD AND EQUIPMENT WITH HIGH PRODUCTIVITY FOR THE SORTING OF PARCELS, the disclosures of which are hereby collectively incorporated herein by reference, or the like, without affecting the scope of the present invention. Preferably, each transport unit 18 includes a frame 20 and a side by side article support capable of supporting side by side articles, such as a pair of carrier belts 22a and 22b, which are supported on frame 20 and driven by corresponding drive motor(s), such as driving means 24a and 24b, in a direction generally orthogonal to the motion of transport units 18 along conveying path 16 (FIG. 3). Each of the drive motors 24a and 24b of each transport unit 18 are operable independently or in conjunction with each other, such as by using the principles disclosed in commonly assigned U.S. Pat. No. 5,588,520, the disclosure of which is hereby incorporated herein by reference. Each carrier belt 22a, 22b of transport unit 18 is movable via actuation of corresponding motors 24a, 24b, which are either directly coupled to a corresponding carrier, or coupled via a belt drive pulley 23 by a cog belt 25. Because each drive motor 24a, 24b, and thus each carrier belt 22a, 22b, may be independently operated, transport units 18 are capable of simultaneously discharging a package from each belt to a corresponding side of conveyor path 16, and may further be operable to induct packages from either side, and/or transfer a package onto the other belt of the transport unit, as discussed in detail below. Preferably, transport units 18 are coupled by a coupling means 26 (FIG. 3), in order to move in unison as one or more trains along conveying path 16. Transport units 18 are propelled along conveying path 16 via a motorized drive system, such as a linear motor 28 of the type disclosed in U.S. Pat. No. 5,588,520.

Each transport unit 18 also may include a top shield or plate 44, which extends from one end of each transport unit 18, in order to provide support of an article and to prevent a package or parcel from falling between two adjacent transport units as the transport units and packages are conveyed along conveying path 16. In the illustrated embodiment, top shields 44 comprise a pair of longitudinally extending wings or plates 44a, which partially insert within an adjacent transport unit, thereby providing continuous support between the transport units, with no gaps therebetween. The support plates 44a engage the adjacent transport unit, such that the surface is maintained between adjacent transport units even when the transport units are curved around a corner of conveying path 16. This provides improved support and enhanced safety for both users of sortation system 10 and for products being transported therealong.

Optionally, a pair of adjacent transport units 18 may be joined as a single transport unit, known as a quad belt transport unit, where each of the pair of adjacent units has side by side carrier belts positioned thereon. The quad belt transport unit (not shown) thus comprises four cells or carrier belts 22, each of which may operate in either an independent mode, where each belt may be movable independently of one or more of the other belts, or a synchronized mode, where two or more of the belts are cooperatively operable with one another. The quad belt embodiment thus provides a larger surface area to accommodate large and even oversized packages, which may be received and discharged by the transport unit via synchronous actuation of each of the cells or belts 22, using principles similar to those disclosed in U.S. Pat. No. 5,588,520. It should be understood that the incorporation of four carrier belts in a transport unit is for convenience and that two side by side belts may be on each transport unit.

Although shown and described as being applicable to transport units having side by side carrier belts on each transport unit, the processes or algorithms of the present invention are also applicable to other transport units having a pair of article supports or support areas at opposite sides of the transport units. For example, the article supports may be tilt trays, rollers, or even a single crossbelt, without affecting the scope of the present invention. The article supports are independently operable to load, unload or transfer articles at the transport units, as discussed below.

Article sortation system 10 is controlled by a computer-based control system 11 which includes a supervision control system, which is joined with an induction control 36 and a sortation control system 34, preferably utilizing the principles disclosed in U.S. Pat. No. 5,588,520. Suffice it to say that the controls are preferably network configured and operable to control the belts of each induction station 12, the linear motor 28 of the conveying path, and the drive motors or means 24a and 24b of each transport unit 18 in response to the location of the transport units, the status of the transport units (booked or not booked) and the articles detected on the induction systems and/or on the transport units, as discussed in detail below. The controls may be further operable to control one or more belts or rollers of a reinduction station 50 (FIG. 2), where applicable, as also discussed below.

As shown in FIG. 3, transport units 18 travel along conveyor path 16 via rolling engagement of a set of vertical and horizontal guide wheels 42 with corresponding tracks or rails 16a of conveyor path 16. An insulated bus (not shown) positioned along conveying path 16 is operable to supply electrical power and data signals to transport units 18 through one or more pickup chute or brush assemblies (also not shown). Drive motors 24a, 24b of transport units 18 are actuated and deactuated in response to an electrical signal from control system 11 and are operable to drive carrier belts 22a, 22b independently in either direction to load or unload articles or to transfer an article from one belt to the other of the transport unit as the transport units move along the conveyor path.

Figure 2:
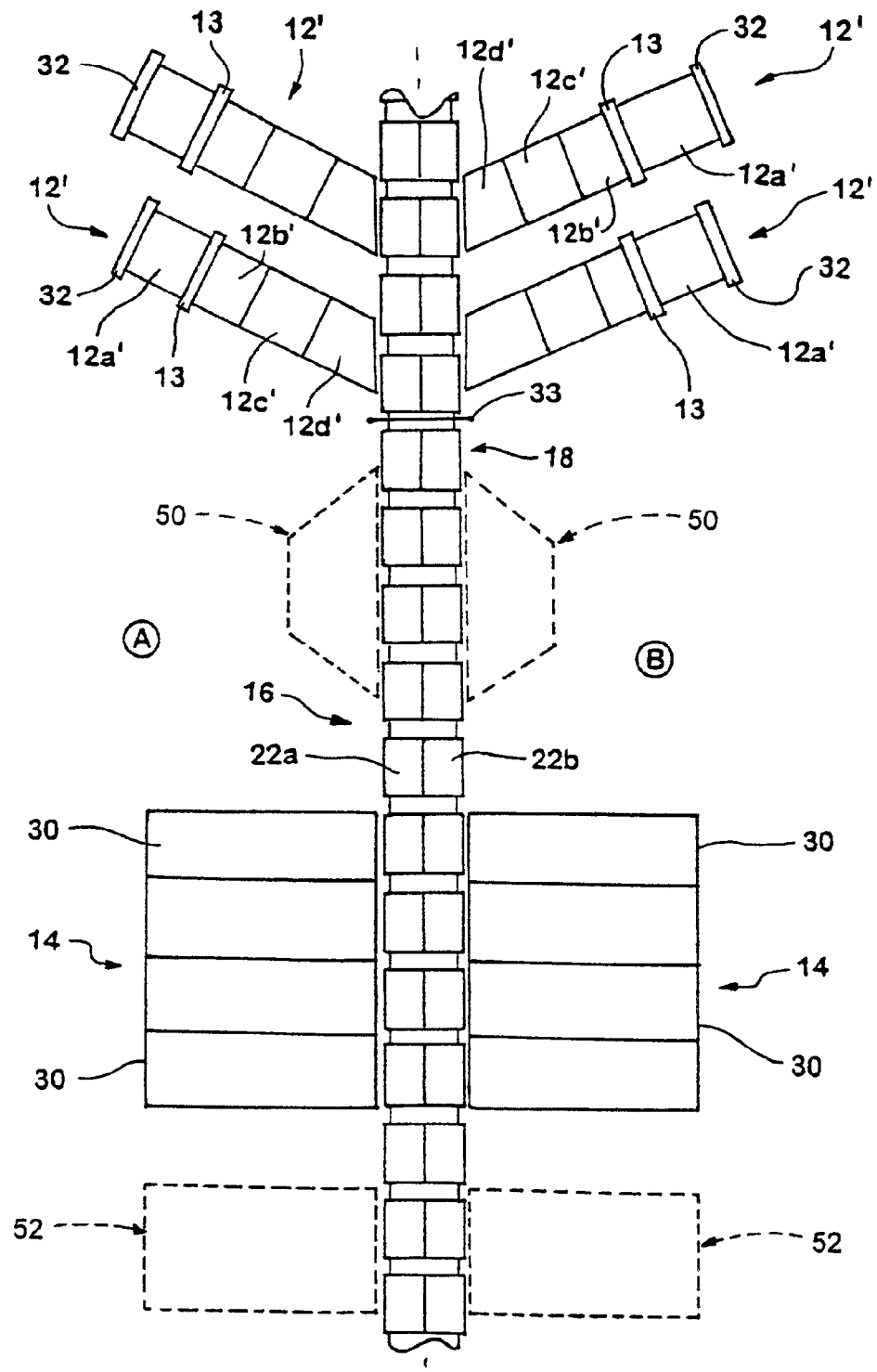
FIG. 2 is a top plan view of a section of a crossbelt sortation system in accordance with the present invention.

As shown in FIGS. 1 and 2, article sortation system 10 includes a plurality of induction stations 12 positioned along both sides of conveyor path 16. A loadability sensor 38, such as a photo sensor or the like, is positioned upstream of induction stations 12 along conveying path 16 and is operable to identify or confirm which transport units 18 are not loaded and, therefore, which are available to be selected or "booked" by one of the induction stations for loading of a particular article. Each induction station 12 is under the control of induction control 36, and includes a series of individually controlled belts aligned at an angle with conveying path 16. In the illustrated embodiment of FIG. 1, the induction station is of the type disclosed in commonly assigned, copending U.S. patent application, Ser. No. 09/669,170, filed Sep. 25, 2000 by Affaticati et al. for HIGH RATE INDUCTION SYSTEM. now U.S. Pat. No. 6,513,641, the disclosure of which is hereby incorporated herein by reference. However, other induction stations, such as those disclosed in U.S. Pat. No. 5,588,520 or the like, may be used.

Preferably, and advantageously, articles or packages may be fed to the individual induction stations 12 irrespective of the ultimate destination of the articles. This avoids the necessity for presorting of the articles as required in Published European Patent EP 0 927 689 A1. As shown in FIG. 1, the induction station 12 includes a plurality of conveying units 12a which are arranged in tandem between a receiving end 12b and a discharge end 12c of each induction unit or station 12. The sortation system further includes a control 11 which controls induction stations 12 in conjunction with the components of sortation system 10. Each conveying unit 12a includes a conveying belt which extends substantially the width of the conveying surface defined by the conveying unit 12. Induction station 12 further includes a photo eye or sensor (not shown) which directs a beam between the belts of adjacent conveying units 12a in order to detect passage of a product or article from one belt to a downstream tandem belt. In the illustrated embodiment, eight conveying units 12a are utilized with each induction unit belt. Each induction unit 12 further includes a transition portion 12d which is oriented in an acute angle, such as 45 degrees, with the continuous conveying path 16 of sortation system 10. Each induction station 12 is operable to adjust a gap between articles and book an appropriate and available cell or carrier for each particular article or product on the induction station. Induction stations 12 are operable to generate a gap between the articles on the upstream most conveying units and then evaluate the length of the product or article at the next downstream conveying units and book the cell or carrier for that article. The remaining conveying units adjust the parcel position to the appropriate cell or carrier which has been booked for that article. Accordingly, the conveying surfaces of the induction units operate in a manner which produces the slowing of an article on the induct and controls the gaps between articles, in order to efficiently load or induct articles onto the transport units 18 of sortation system 10.

Articles are received by induct stations 12 via a product source or supply conveyor or device 12e at induction or upstream end 12b of induction station 12. The articles are then moved or conveyed along the induction station toward the discharge end 12c at the transport units. Because the conveying units 12a are operable to move the articles from one unit to the next downstream unit until the article is moved to the discharge end and loaded onto the available or appropriate transport unit, as discussed below, the articles are conveyed along the induction station and loaded onto the transport units generally in the order in which they are received or supplied at the induction end 12b. Alternately, as shown in FIG. 2, the belts of an induction station 12' may include a coding belt 12a', a buffer belt 12b', a synchronization belt 12c', and a loading or transition belt 12d', similar to the induction belts which are disclosed and described in detail in U.S. Pat. No. 5,588,520, without affecting the scope of the present invention.

Figure 5:
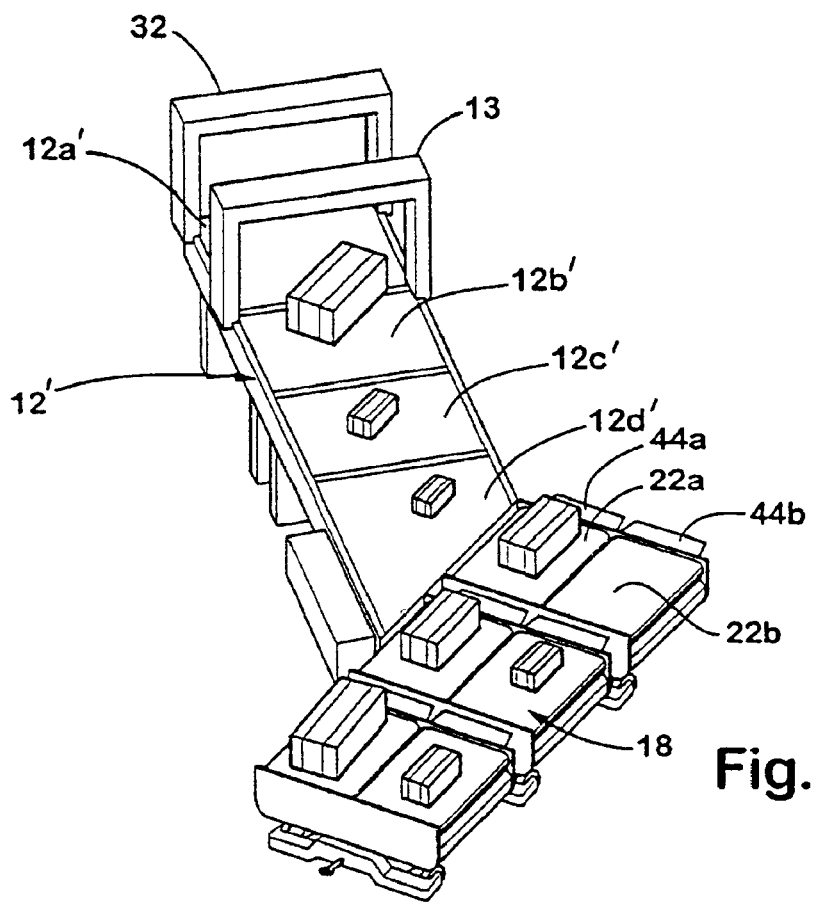
FIG. 5 is perspective view of an induction station inducting packages onto the transport units of FIG. 3.

Each induction station 12 includes an article or parcel sensor 13, which is positioned at one of the upstream conveying units 12a and is operable to determine the length, width and lateral position of each article on induction station 12. Additionally, an article identification scanner 32 is preferably provided at each of the induct stations 12, as shown in FIGS. 1, 2 and 5, and is operable to provide an input to sortation control 34 which conveys information scanned from each article to either identify the article or confirm the identification of the article, in order to ensure that the articles are discharged at the appropriate receiving port 30. Alternately, or additionally an article identification system or scanner 33 may be positioned along the conveying path and is likewise operable to scan articles on the transport units and convey information to induction control 36 with respect to which side of conveying path 16, such as an outer side A or an inner side B, the articles are to be discharged from the transport units.

Induction control 36 is operable to control the movement of the belts of conveying units 12a of the induction stations 12. Additionally, induction control 36 monitors parcel sensor 13 in order to identify the article and the discharge station or destination associated with the article, and to determine the position of the article on the induction belt and to calculate the article dimensions.

When an article is received at induction station 12 at one of the conveying units 12a at upstream end 12b, induction control 36 receives identification of the article by the identification system 32. The article is then transferred from the upstream belt to a downstream adjacent belt, while induction control 36 calculates the article position from the lateral edge of the belt, as well as article length and article width in response to article sensor 13. If other articles are on one or more of the downstream belts and awaiting loading onto one or more transport units 18, one or more of the upstream belts may decrease in speed until the article on the downstream belts is loaded.

Induction control 36 selects and books one or more of the appropriate support areas or carrier belts 22a, 22b of an available transport unit 18, depending on the size of the article, the destination of the article and/or the status of the approaching transport units, as may be determined by loadability sensor 38, as discussed in detail below with respect to processes 100, 300 and 500.

Based on the article length and position, induction control 36 performs calculations to establish the location of a loading synchronization point as the booked transport unit or units are approaching the induction station. When the booked cell or cells arrive at the synchronization point, induction control 36 activates the loading belts 12d and correspondingly activates the drive motors for one or more of the support areas of one or more of the booked transport units for that article, in order to accelerate and move the article onto the appropriate cell or cells of the transport unit or units.

As shown in FIG. 2, two or more discharge stations 14 may be positioned downstream from several induction stations, and at both sides of the conveying path. Each discharge station 14 is made up of a plurality of receiving ports 30, which may be positioned along one side of conveying path 16, or along opposite sides of conveying path 16. Receiving ports 30 may include a divided chute (not shown) to control the discharge of the packages, depending on the particular details of the application, as disclosed in commonly assigned U.S. Pat. No. 5,588,520. Alternately, the receiving parts may be a gravity or powered conveyor, a cart, a hamper, or the like. A re-centering station 40 may be provided downstream of each induction station 12 along the conveying path 16. The recentering station 40 is operable to verify, by use of photo sensors or other means, that each article is centered on each article support area or areas of the respective transport unit 18, and if the article is not centered, the article support or supports, such as one or more carrier belts, may be jogged or adjusted to re-center the article on the particular article support and/or transport unit, as disclosed in commonly assigned U.S. Pat. No. 5,588,520.

Additionally, article sortation system 10 may include one or more reinduction stations 50 (FIG. 2), which are operable to receive an article or package from the transport unit and to reinduct or reload the article onto a later transport unit with an available or empty carrier belt or cell. Reinduction stations 50 may include a belt similar to a carrier belt 22a, 22b or other bi-directional conveying surface that is movable orthogonal to the conveying path 16. The reinduction stations 50 allow a package or article to be temporarily removed from the transport units in order to avoid total or partial blocking between articles on a particular transport unit. Total or partial blocking occurs when one or both articles are targeted to be discharged at the opposite side of the transport unit from the side at which they are initially positioned or loaded with another article preventing the discharge thereof. For example, if an article on the right side of the transport unit is to be discharged to a receiving port 30 on the left side, while an article is on the left side of the transport unit and is not being discharged to the left prior to the first article, then a blocking condition exists. Preferably, one or more reinduction stations 50 may be provided at each or both sides of the conveying path, and downstream of the group of induction stations 12 and upstream of a corresponding group of discharge stations 14, as shown in FIG. 2. As will be described in more detail below, articles in a blocked condition can be momentarily unloaded from a transport unit to a reinduction station and reloaded to a subsequent transport unit in a manner that does not result in a blocked condition.

Sortation system 10 may further include one or more reject chutes 52 (FIG. 2) for receiving articles or packages from the transport units which were unable to be discharged at their appropriate discharge stations or chutes. The reject chutes 52 are positioned downstream of the group of discharge stations 14, such that the articles may be discharged into the reject chutes before the transport units move along the conveying path 16 to the next set of induction stations. The transport units are thus empty and available for receiving articles from the next set of induction stations. The reject chutes 52 allow the transport units to be emptied and assist in avoiding or correcting blocking situations and avoiding recirculation of one or more articles around the loop of the conveying path 16, as discussed below. However, in certain applications, it may be preferred to recirculate packages rather than unload the packages into the reject chutes, thus requiring manual handling of the packages, depending on the application of the sortation system, as also discussed below.

As best shown in FIG. 5, articles, parcels or packages, such as boxes, envelopes, bags and/or the like, are conveyed along induction station 12 toward transport units 18 moving along conveying path 16. Article identification scanner 32 identifies the article and provides the identification to an induction control 36. The induction control or control system 11 determines the destination side for the article or parcel, and may identify a particular destination chute, port or location along either side of the conveying path 16. Article sensor 13 determines the size and orientation of the parcels as they pass by article sensor 13 at induction stations 12. The availability sensor 38 and induction control 36 then determine which cell of which approaching transport unit is to be booked for each particular article on induction station 12, in response to the destination of the articles via scanner 32. The destination of each article is communicated to the induction control 36 which side (A or B) of conveying path 16 the articles are to be discharged to, so that induction control 36 may determine which transport unit is appropriate for each article, depending on the available, or unbooked, space on the transport unit, and on any article which may already be positioned on one of the two side by side cells of the unit, as discussed below.

Once a cell of a transport unit is determined to be available and appropriate for the next article on the induction station, that cell is booked by the induction control and sortation controls. Other induction stations then cannot book or load the same cell. When the booked cell of the transport unit arrives at the induction station, the article is then moved from the induction station to the booked cell using known loading algorithms and transported along conveying path 16 to the targeted destination or discharge port, where it is then discharged using known discharge algorithms. Loading and discharge algorithms are disclosed in commonly assigned U.S. Pat. No. 5,588,520. Articles destined for the opposite side of the conveying path 16 from the induction station at which they are initially positioned may be loaded onto one side of the transport unit and subsequently transferred to the opposite support or cell, if the other side is open and not booked.

Because the articles may be inducted onto either side of the transport units 18, and then may be transferred from one side to the other, if necessary, the present invention provides improved system throughput without the need for presorting of the articles. As the articles are inducted onto the transport unit, the controls of the present invention effectively sort the articles, which may have a destination at either side of the conveying path 16, by sequencing the loading and/or moving of articles to the appropriate side of the transport units in response to the destination of one or both of the articles to be positioned on the transport unit, thereby achieving a similar throughput as a presorted single cell or single crossbelt system. It is further envisioned that the articles may be presorted at the multiple induction stations or areas, which results in substantially improved throughput over conventional systems. Because articles may be transferred from one side or cell to the other, and each transport unit may transport articles destined for either side of the conveyor path, the present invention does not require that articles be necessarily accepted and inducted in a strict sequence. The articles thus may be scheduled and inducted from whichever induction station provides optimal sequencing of the articles, depending on the destination of the next articles on the induction station or stations and on the application of the sortation system, as discussed below.

In order to prevent cell gridlock, where there is complete blocking between the articles because an article present on a cell on one side "A" of the transport unit is to be discharged on the other side "B", but another article which is to be discharged on the "A" side is already present on the cell on the other side "B", articles may be identified at the induction station prior to being inducted onto the next available transport unit, in order to determine the destination side for each of the articles. It is then possible for the control system of the present invention to predetermine the induction sequence to prevent such cell gridlock. By effectively presorting and sequencing articles prior to inducting the articles onto the booked cells, the present invention substantially reduces the likelihood of cell gridlock. Additionally, depending on the application, such articles may be loaded onto a transport unit and then unloaded at a recirculation station or reject chute to allow one of the articles to be loaded, transferred and then unloaded at its appropriate discharge station. The article at the reinduction station may then be re-inducted onto a cell of a next available and/or appropriate transport unit.

Figure 4:
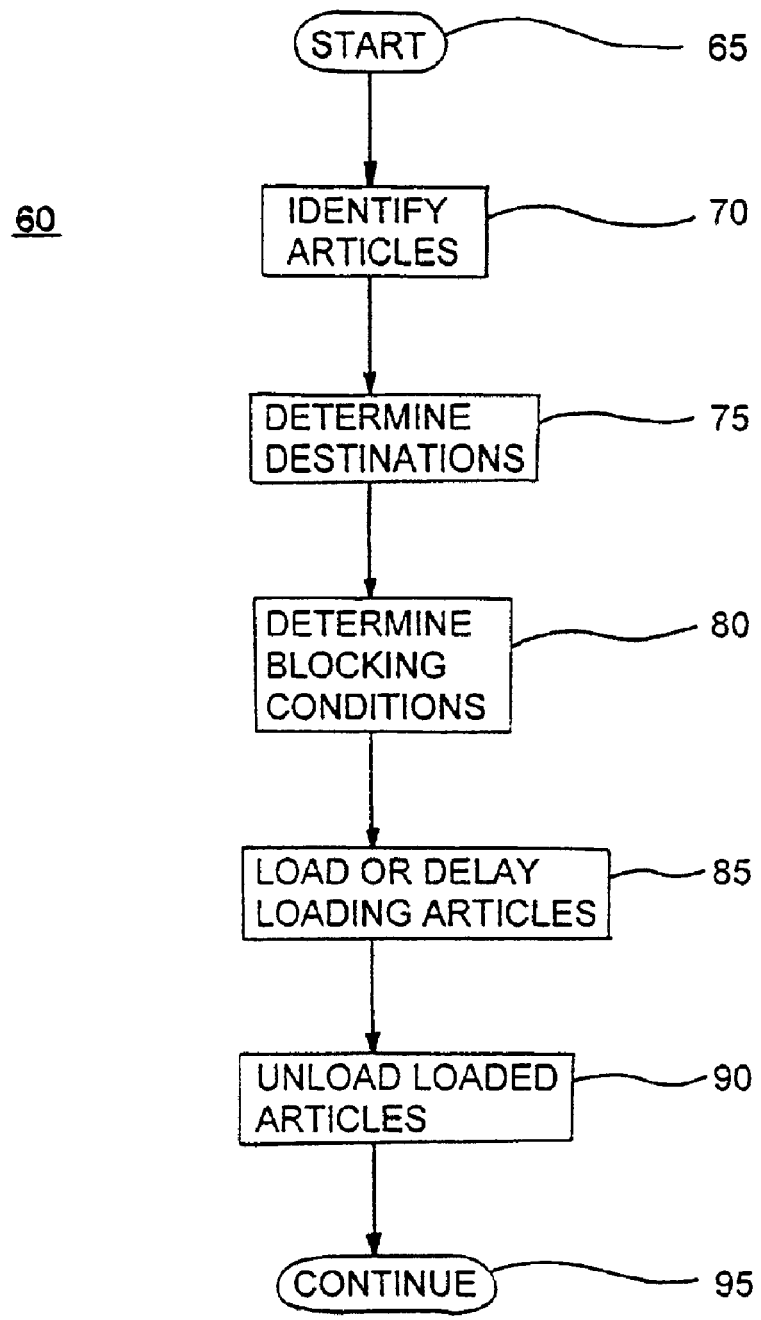
FIG. 4 is a flowchart of a control process in accordance with the present invention.

Referring to FIG. 4, a control process 60 of the present invention is operable to identify the articles at the induction stations and determine an appropriate loading and unloading sequence for the articles. Process 60 starts at 65 and identifies the articles at the induction stations at 70. The destinations of the articles are then determined at 75 and any potential blocking condition, such as a partial blocking condition or a full blocking condition, is determined at 80. Process 60 then loads or delays loading of the articles at 85, in response to the destinations and/or the blocking conditions between the articles. The process may delay loading of one or more articles onto an available transport unit to avoid a full or partial blocking condition between that article and another article at the induction station or at a different induction station. The articles that are not loaded may then be loaded onto a subsequent transport unit. The articles which are loaded onto the transport units are then unloaded at an appropriate location at 90. The appropriate location may be at their destination or discharge port, either at a first or second pass of the discharge port, or at a reinduction station, depending on the particular application, particular process, destination of the articles and/or blocking condition between the articles. If an article is unloaded at a reinduction station, the article is then reinducted onto an available transport unit and then unloaded at its destination downstream from the induction station. Process 60 then continues at 95 by returning to start at 65 and identifying the next articles at the induction stations.

Preferably, the control system of the present invention may be operable in one or more different modes, depending on the application of the system and desired results. For example, the control system may be operable in a blind loading mode, whereby articles are loaded onto the transport unit without regard to their destination, and the control system is then operable to identify and sequence the unloading of the articles to an appropriate discharge chute, reinduction station and/or reject chute, depending on the destination of each article relative to the other article on the particular transport unit, as discussed in detail below with respect to process 100 and FIG. 6.

Optionally, a second mode or algorithm, referred to as a non-rejection mode or algorithm, may be implemented to control the loading and unloading of the articles by scanning the articles at the induction stations and determining an appropriate cell of the approaching transport units for the articles at each induction station on either side of the conveying path prior to inducting the articles onto the transport units. For example, a reject and/or reinduction avoidance mode may be implemented to load, transfer, and unload articles in a manner so as to avoid sending the articles into a reject chute or into a reinduction station. This process is operable to determine which article is to be unloaded downstream of the other article and/or at the other side of the conveying path and/or which induction chute has priority over the other, and then load one or more articles onto the transport units or delay loading of one or more articles onto the transport units in response to such determination, as discussed in detail below with respect to process 300 and FIG. 7.

An additional mode or process of the present invention, referred to as an auto adjusting process or algorithm may be provided. In such a mode, the control system may load and unload articles in response to the destination of the articles, the availability of the reinduction station, and the priority of the various induction stations. In this manner, the articles may be loaded onto an appropriate carrier cell of an appropriate transport unit and unloaded into the targeted discharge chute or into a reinduction station, without requiring manual intervention, as discussed in detail below with respect to process 500 and FIGS. 8A–C. The selection or application of one or more of these processes depends on the application of the sortation system and/or on the desired result of the sortation processes, such as maximum throughput, minimal recirculation of articles, availability of a reinduction station and/or the like.

Figure 6:
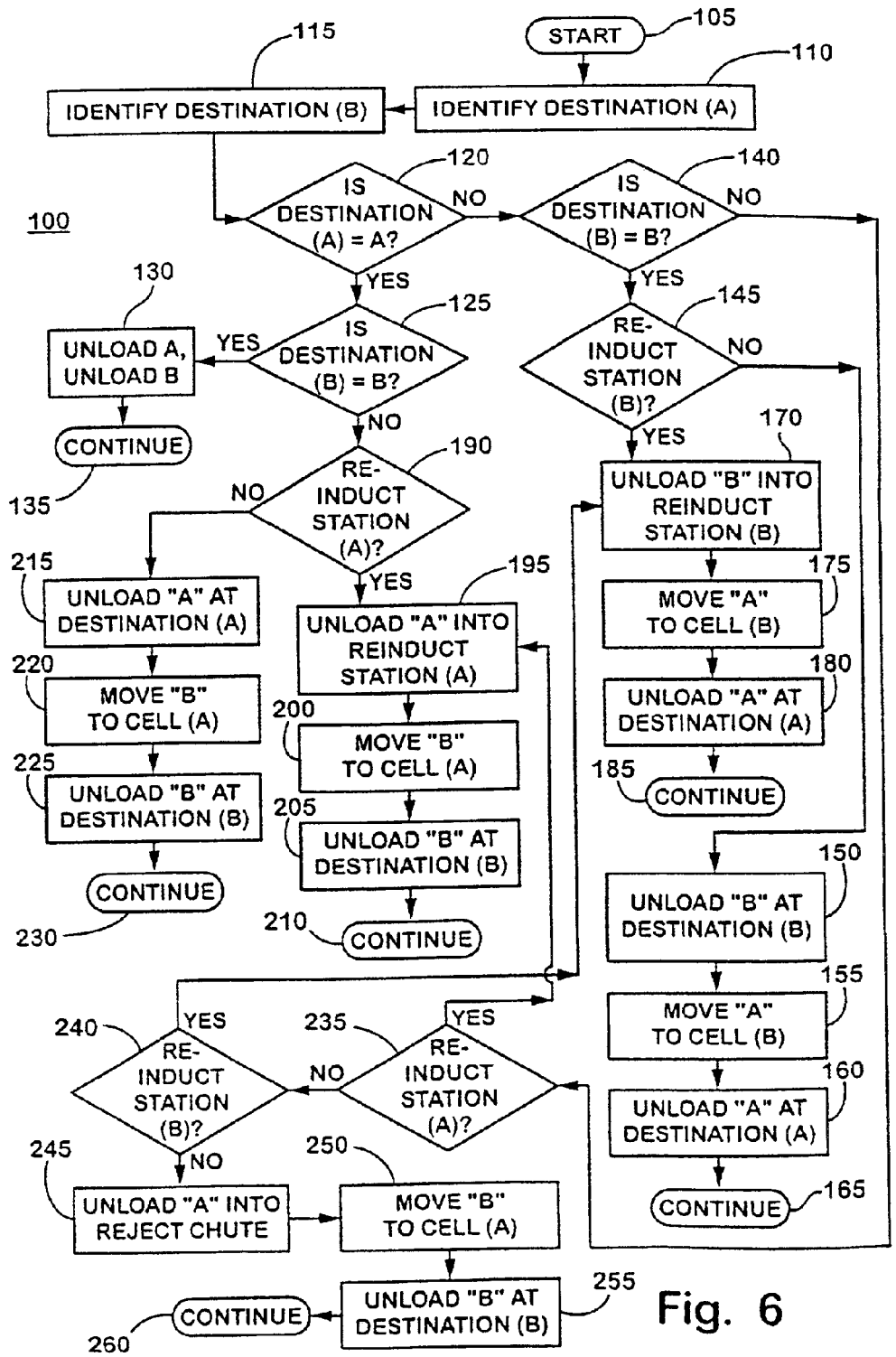
FIG. 6 is a flowchart of a control process in accordance with the present invention.

Referring now to FIG. 6, a blind loading process 100 may be implemented to accommodate blind loading by the induction stations of articles onto cells of transport units as the transport units move past the induction stations on either side of the conveying path. In this application, the induction stations may be operable to blindly, or sequentially, load articles onto available cells of the approaching transport units without regard to the destinations of the articles. The control system is then operable to identify the articles via scanner 33 along conveying path 16 and determine the unloading sequence of articles that are loaded onto the cells of the transport units. The blind loading mode or process allows the sortation system to always load available cells at each induction station, which may be beneficial in applications where there is flexibility in the destination of the articles being sorted. This may occur, for example, where multiple discharge stations 14 are assigned to the same ultimate destination such as a single store, such as in grocery store applications or the like. This reduces the requirement that a parcel necessarily be sorted to one and only one discharge station. Process 100 is preferably applicable when the items or articles are loaded with a side destination, such as A or B, and without a particular chute destination. The algorithm or process 100 may be configured each time that the item barcode or identification label is read by the scanner 33 on the loop of the conveying path rather than at the induction station. In such an application, articles are loaded onto the first available cell of the transport units from induction stations on both sides of the conveying path, irrespective of the targeted discharge port for either article being loaded onto the transport unit. The articles may be loaded from the induction stations if the cell of the particular transport unit is free or empty and not already reserved or booked by a downstream induction station at the same side of the conveying path. This process may provide that between two consecutive articles loaded from the same induction station, a number of free cells or transport units equal to the number of downstream induction stations along the same side not be booked or used by that particular induction station. This prevents the upstream induction station or stations from loading articles onto each transport unit, so transport units are available for loading by the downstream induction stations as well.

Article unloading process 100 is operable to identify the destination of articles loaded on cells of the transport units via scanner 33 along conveying path 16 and to determine an appropriate unloading sequence of the articles to minimize recirculation of the articles and to correct for partial or full blocking situations which may occur between the articles on the transport units. Process 100 starts at 105 and identifies the destination of an article on one side (A) of the transport unit at 110 and further identifies a destination of another article on the other side (B) at 115. It is then determined at 120 whether the destination of the article A is at side A of the conveying path. If the destination of article A is at the same side A, then it is further determined at 125 if the destination of article B is at side B of the conveying path. The articles are loaded to respective sides of one or more transport units irrespective of their destinations. If the destination of article B is at side B, process 100 proceeds to unload articles A and B at the respective ports along the respective sides of the conveying path at 130 and continues at 135 by returning to start at 105 to identify the articles at the next transport unit.

If, on the other hand, it is determined at 120 that the destination of article A is not at side A of the conveying path, it is again further determined at 140 whether the destination of article B is at side B. If it is determined at 140 that the destination of article B is at side B, then a partial blocking scenario exists, whereby both articles are to be unloaded at the same side (B) of the conveying path and not necessarily in proper sequence. It is then determined at 145 whether the conveying path includes an operable and available reinduction station along side B. This determination may be preset as a default setting if the conveying path does not include an induction station therealong, or may be a step in the process to determine if the reinduction station along side B is currently operable and/or available. If it is determined at 145 that there is no operable or available reinduction station along side B, then process 100 proceeds to unload article B at its appropriate discharge chute along side B at 150, move article A over to the opposite side B of the transport unit at 155, and unload article A at the appropriate destination or discharge station or chute along side B at 160. If the discharge chute for article A is upstream of the discharge chute for article B, then the article on side A of the transport unit will be unloaded into the appropriate chute or port on side B during the next lap of the transport unit around the conveying path. Process 100 then continues at 165 by returning to start at 105 to identify the destination of articles on the next transport unit. In this manner, both parcels will be delivered to their destination, but the parcel on the A side will require an extra trip around the carousel.

If it is determined at 145 that a reinduction station is operable along side B of the conveying path, then article B is unloaded into the reinduction station along side B at 170. Article A is then moved to the cell on side B of the transport unit at 175 and unloaded at the appropriate destination or discharge port or chute along side B of the conveying path at 180. In this example, because the reinduction station is upstream of the discharge ports or stations, the article on side A of the transport unit is moved to the other side and unloaded at that side of the conveying path during the first pass of the transport unit by the discharge stations, such that no re-circulation of either of the articles will be required. The process then continues at 185 by returning to start at 105. Article B will be reinducted onto an available cell of a later transport unit and discharged at its appropriate discharge chute when an appropriate transport unit is available.

If it is determined at 120 that the destination of article A is on the A side and is further determined at 125 that the destination of article B is also on side A of the conveying path, such that there is a partial blocking condition between the articles, which are in this case both destined for side A of the conveying path, process 100 proceeds in a similar manner as discussed above when both articles are destined for side B of the conveying path. More particularly, it is determined at 190 whether there are operable and available reinduction stations along side A of the conveying path. If it is determined at 190 that there is a reinduction station operable and available along side A, then article A is unloaded at the reinduction station at 195, article B is moved to the A side of the transport unit at 200, and article B is unloaded at the appropriate discharge port or chute along side A at 205. The process 100 continues at 210 by returning to start. Further, if it is determined at 190 that there is no operable reinduction station along side A, then article A is unloaded at an appropriate discharge port on side A of the conveying path at 215, article B is moved to the opposite side of the transport unit at 220, and article B is unloaded at its appropriate destination along side A at 225, and may be unloaded during the next pass or after a lap of the transport unit about the conveying path or loop, if the destination of article B is upstream of the destination of article A. Process 100 then continues at 230.

If it is determined at 120 that article A is to be unloaded at side B and it is further determined at 140 that the destination of the article on side B of the transport unit is on side A of the conveying path, a full blocking condition exists between the articles, whereby each article is targeted to be discharged on the opposite side of the conveying path from the side of the transport unit at which they are located. It is further determined at 235 and 240 whether an operable and available reinduction station is present along side A or B of the conveying path, respectively. If it is determined at 235 that an operable and available reinduction station is present along side A, then process 100 returns to 195 to unload the articles as discussed above. On the other hand, if there is no reinduction station along side A, yet it is determined at 240 that there is an operable and available reinduction station along side B of the conveying path, then process 100 returns to 170 to unload the articles, as also discussed above. However, if it is determined at 235 and 240 that there is no operable and available reinduction station along either side A or B, then process 100 proceeds to unload article A into the reject chute at 245. Article B is then moved to the other side A of the transport at 250 and unloaded at an appropriate discharge port or chute along side A at 255. Because the reject chute is positioned downstream from the appropriate discharge ports or chutes, article B will be unloaded at its appropriate destination during the next lap of the transport unit around the conveying path. Article A will be manually moved from the reject chute to its proper destination at a later time. Process 100 continues at 260. Of course, the system could discharge article B to the reject chute and unload article A to it appropriate destination, without affecting the scope of the present invention.

Accordingly, blind loading process 100 is operable to determine an optimal unloading sequence of the articles positioned on each side of the transport units with a minimal amount of re-circulation of the articles about the conveying path loop. The process may or may not utilize a reinduction station, which facilitates unloading of the articles with no recirculation arising for one or both of the articles. Because process 100 is applicable where articles are continuously and blindly loaded onto each available cell of each transport unit by the induction stations, process 100 is operable to identify the destination or targeted discharge chute for each of the articles that have already been loaded onto the transport units and as they are transported along the conveying path, yet while they are upstream from the reinduction stations or discharge chutes.

Figure 7:
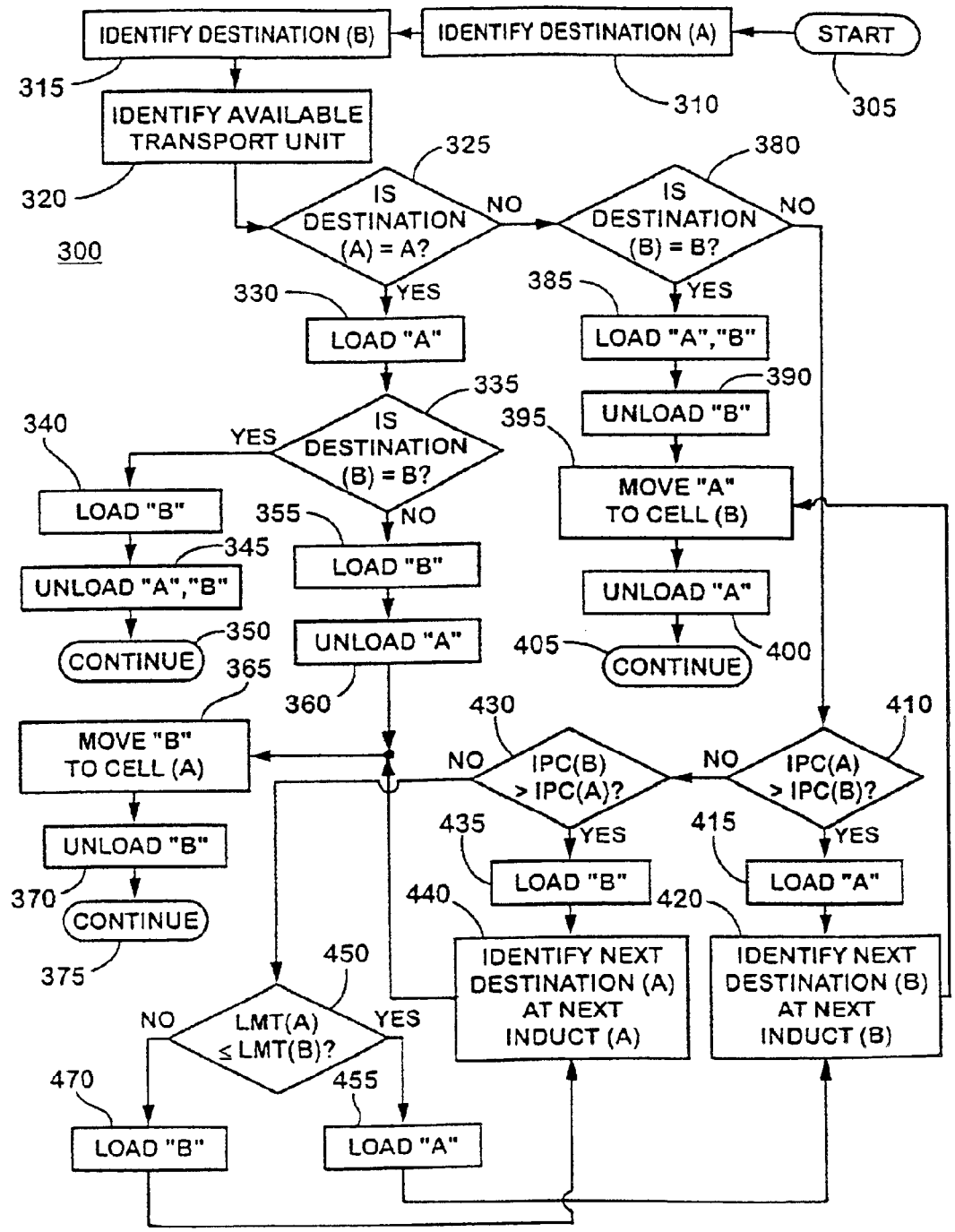
FIG. 7 is a flow chart of another control process in accordance with the present invention.

Referring now to FIG. 7, non-rejection process 300 is operable to sequence the loading and unloading of articles onto the cells of transport units in order to limit or prevent the sending of the items to a reinduction station 50 or reject chute 52. The induction station at either side of the conveying path is controlled to load articles onto a corresponding cell of the transport unit if the cell is empty and not already reserved or booked by a downstream induction station on the same side of the conveying path. Similar to process 100, the sortation system may be operable to leave an amount of free or empty cells or transport units between two consecutive articles loaded by the same induction station, which is approximately equal to the number of downstream induction stations along the same side, in order to prevent a back up of articles at the downstream induction stations. Process or algorithm 300 is applicable in applications where the item or article barcode or identification label is read by a scanner 32 at the induction station. The algorithm functions to delay loading of an article onto a transport unit in order to minimize or avoid offloading of the article into the reinduction station or into a reject chute.

Process 300 starts at 305 and identifies the destination (destination A) of an article (article A) at an induction station at the A side of the conveying path (induction station A) at 310 and further identifies the destination (destination B) of an article (article B) at an induction station at the B side of the conveying path (induction station B) at 315. Process 300 further identifies or determines the available approaching or unbooked cells of the transport unit or units at 320. It is then determined at 325 whether the destination of article A at induction station A is at the same side (side A) as the induction station. If it is determined at 325 that the destination of the article A is on the same side A, then the article A is loaded onto that particular cell of the transport unit at 330. It is then determined at 335 whether the destination of the article B at induction station B of the conveyor path is at the same side (B) of the conveying path. If it is determined at 335 that the destination of the article B is at side B, then article B at induction station B is loaded onto the corresponding cell of the transport unit at 340. The articles on each side of the transport unit are then unloaded at 345 at their appropriate discharge chutes along the respective sides of the conveying path. Process 300 then continues at 350 by returning to start at 305 to identify the destination of other articles at the induction stations.

If it is determined at 335 that the destination of article B is at the opposite side from induction station B or at side A, then article B on induction station B may be loaded onto the corresponding cell of the transport unit at 355. The other article (article A) from induction station A is then unloaded at its appropriate destination chute at 360, whereby article B is transferred over to the now empty cell on the A side of the transport unit at 365 and then unloaded at 370 at the appropriate discharge chute along side A of the conveying path. If article B is to be un-loaded at a downstream chute from the discharge chute of article A, then the unloading at 370 will occur during the same lap or pass of the transport unit about the conveying path. Otherwise, the article B will be transported around the conveying path and will be offloaded at its appropriate chute on the A side during the next lap of the transport unit. Process 300 then continues at 375 by returning to start at 305.

On the other hand, if it is determined at 325 that the destination of the article A at induction station A is at the opposite side or at side B of the conveying path, then it is further determined at 380 whether the destination of the article at induction station B is at the same side (B) of the conveying path. If it is determined at 380 that the destination of article B is at the B side of the conveying path, such that both articles are to be discharged along the B side of the conveying path, then both articles may be loaded onto the respective cells of the transport unit at 385. The article B from induction station B is then unloaded at its appropriate discharge chute at 390, whereby the article A from induction station A is moved across the transport unit to the cell of the transport unit on the opposite or B side of the transport unit at 395. Article A is then unloaded at its appropriate chute along the B side of the conveying path at 400. If the article A from induction station A is to be discharged downstream from the article B from induction station B, the unloading of article A occurs during the same lap or pass of the transport unit about the conveying path. Otherwise, the unloading of article A occurs during the next lap. Process 300 then continues at 405 by returning to start.

If it is determined at 380 that the destination of article B is at the opposite side (A) of the conveying path, a full blocking situation arises because the destination of each article is at the opposite side of the conveying path from the induction station of the article. It is then determined at 410 whether an induction priority counter for induction station A is greater than an induction priority counter for induction station B. The induction priority counters determine how many times an article is not loaded by the induction station when a potentially available transport unit passes thereby. If the article is not loaded onto an available transport unit for any reason, such as due to a full blocking condition between the articles to be loaded onto the transport unit by the induction stations at opposite sides of the conveying path, then control 36 is further operable to increment the induction priority counter for the induction station which could not load the article. The induction priority counter thus determines how many times each induction station was unable to load an article, such that an induction station with a higher counter value or induction priority may be selected to load a respective article over an induction station with a lower counter value, in order to avoid a back up or pile up of articles at any one of the induction stations. The induction priority counters are thus incremented each time an article is not loaded onto a transport unit by the induction station and are reset to zero each time an article is loaded by the induction station. If it is determined at 410 that the induction priority counter for induction station A is greater than the induction priority counter for induction station B, then article A from induction station A is loaded onto the cell on the A side of the transport unit at 415. The process 300 then proceeds to identify the destination of an article at the next downstream induction station along the B side of the conveying path, in order to determine if it is appropriate to load an article onto the B side cell of the transport unit at 420. Otherwise the transport unit proceeds along the conveying path and process 300 returns to 395, where article A is moved across to the B side of the transport unit and unloaded at its appropriate chute, as discussed above. The control 36 then increments the induction priority counter for induction station B.

If it is determined at 410 that the induction priority counter for induction station A is not greater than the induction priority counter for induction station B, then it is further determined at 430 whether the induction priority counter for induction station B is greater than the induction priority counter for induction station A. If it is determined at 430 that the induction priority counter for induction station B is greater than the induction priority counter for induction station A, then article B at induction station B is loaded at 435 onto the B side cell of the transport unit. The process then identifies the destination of an article at a downstream induction station along the A side of the conveying path at 440. Process 300 then returns to 365, where article B is transferred over to the other side of the transport unit for unloading at an appropriate discharge chute along the A side of the conveying path. The induction priority counter for induction station A is then incremented by the induction control 36.

If it is determined at 430 that the induction priority counter for induction station B is not greater than the induction priority counter for induction station A, such that the induction priority counters for the two induction stations are equal, then it is further determined at 450 whether a last minute throughput value for induction station A is less than or equal to a last minute throughput value of induction station B. In this application, each induction station may be assigned a last minute throughput value, which further prioritizes the loading sequence of the induction stations for situations where the induction priority counters of two induction stations are equal. The last minute throughput value may be based on the type of article, destination of the articles or other characteristic of the article or the sortation system. If it is determined at 450 that the last minute throughput value for induction station A is less than or equal to the last minute throughput value for induction station B, then the article A at induction station A is loaded onto an appropriate cell of the transport unit at 455. The process then returns to 420, as discussed above, to identify other articles at the downstream induction stations along the B side of the conveying path and to move article A to the B side cell of the transport unit and unload article A at its appropriate discharge chute. On the other hand, if it is determined at 450 that the last minute throughput value for induction station A is greater than the last minute throughput value for induction station B, then the article B at induction station B may be loaded at 470 onto the appropriate cell of the transport unit. The process then returns to 440, as discussed above, to identify other articles at downstream induction stations along the A side of the conveying path and to move and unload article B.

Accordingly, articles are loaded onto the cells of the transport units in a sequence or manner that allows the articles to be unloaded at the appropriate side of the respective transport unit downstream from the induction stations. In situations where a blocking condition may occur, one of the induction stations may delay in loading one or both of the articles to avoid the blocking condition and may load an article onto the transport unit depending on a priority value of the induction station or a last minute throughput value associated with the induction station or the article. In certain partial blocking situations, one of the articles may remain on the transport unit for a full lap of the transport unit, prior to being unloaded at its appropriate discharge chute. Process 300 functions to reduce the need to unload articles into the reject chutes or reinduction stations of the sortation system, while effectively sorting and loading/unloading articles from induction stations at both sides of the conveying path. Process 300 thus delays loading of some articles in full blocking situations, in order to avoid such situations and thus avoid the need to use a reinduction or reject chute.

Figure 8A:
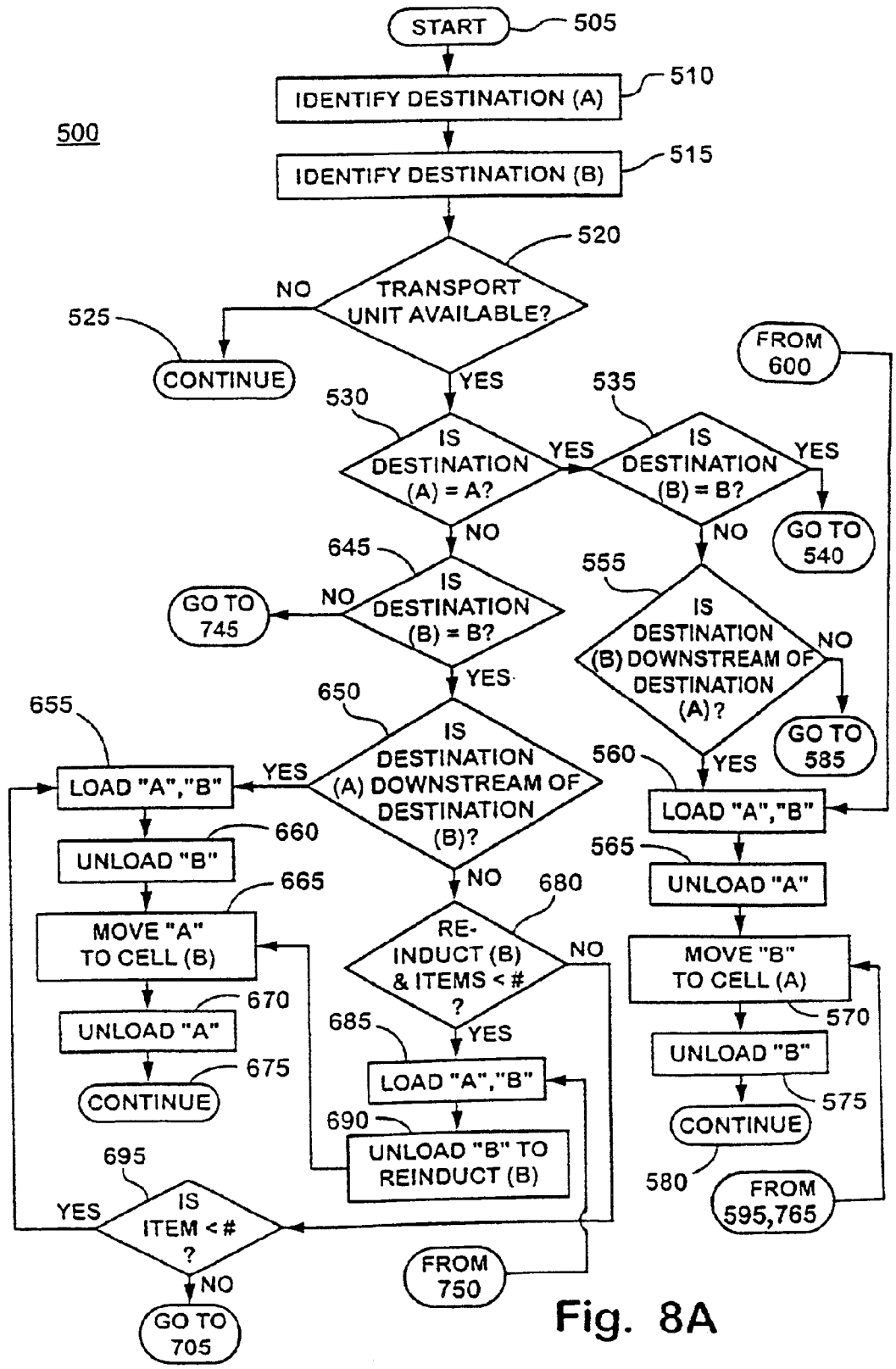
FIGS. 8A–C are a flow chart of yet another control process in accordance with the present invention.
Figure 8B:
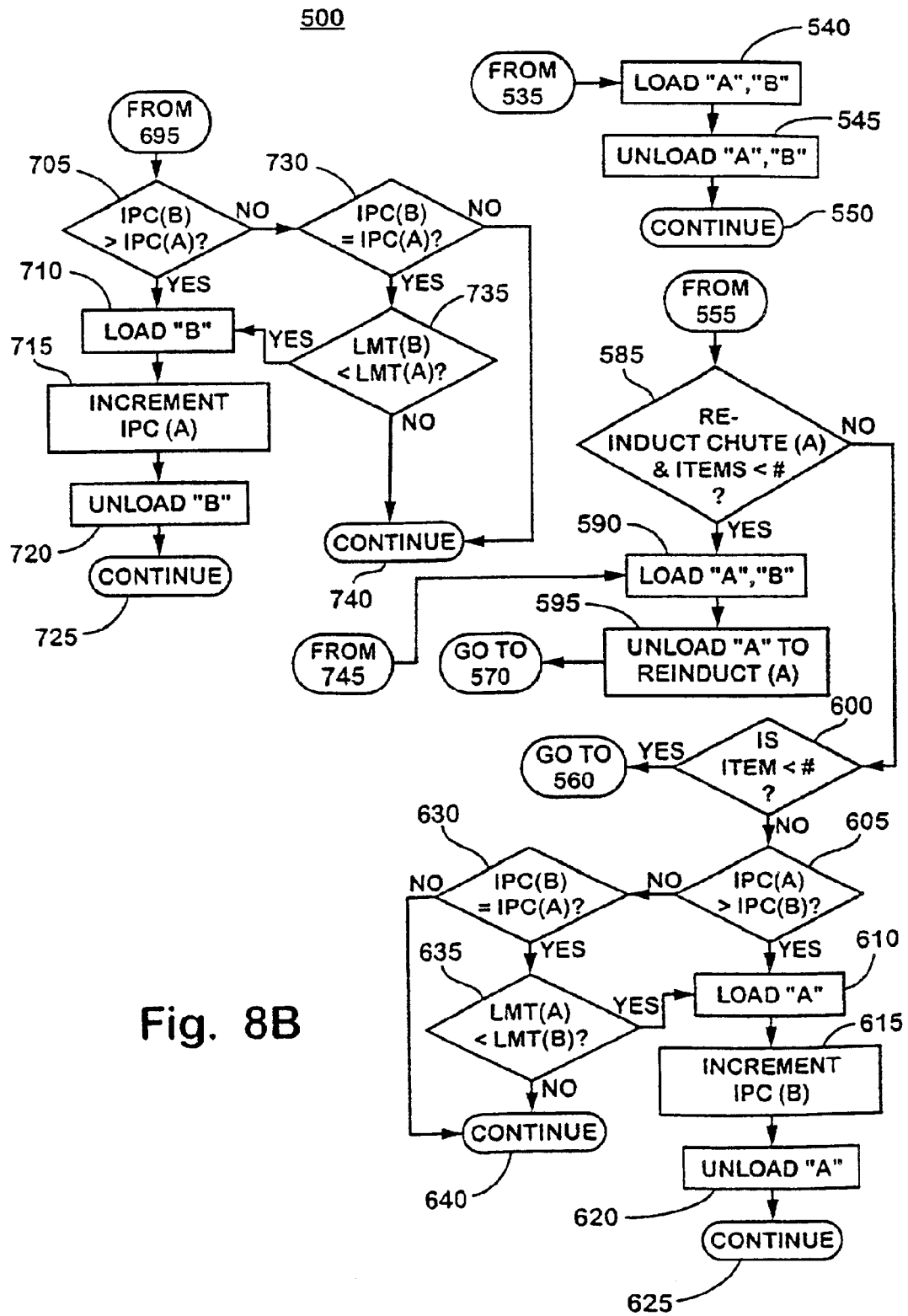
Figure 8C:
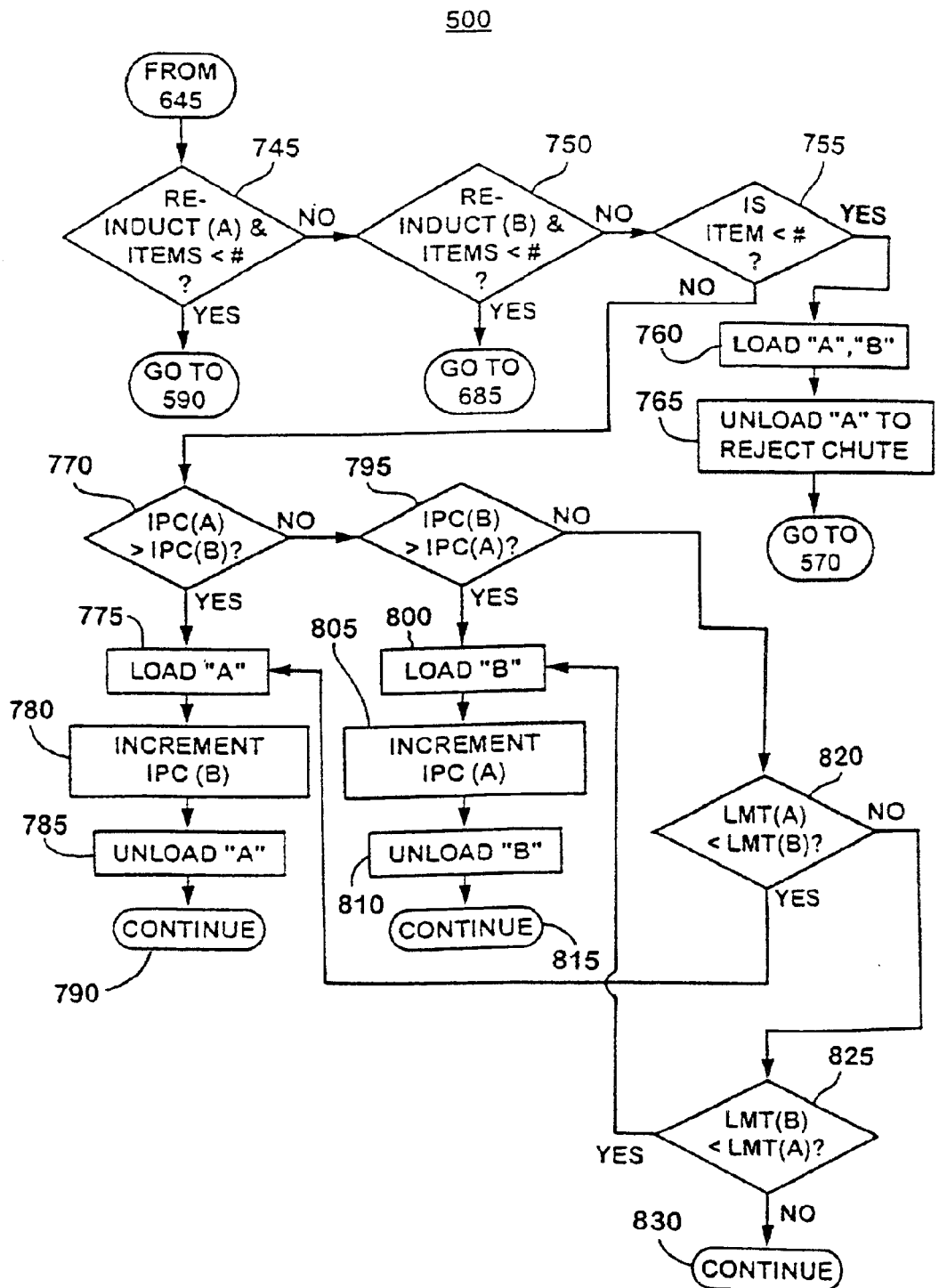

Referring now to FIGS. 8A–C, an auto-adjusting process 500 is operable to sort or sequence the loading of articles at induction stations on both sides of the conveying path such that the articles again avoid being discharged into a reject chute. Process 500 also avoids or limits recirculation scenarios where an article is transported by the transport unit around the entire lap of the conveying path prior to unloading at its appropriate discharge chute. Similar to the above discussed processes, process 500 is operable to load items from induction stations at either side of the conveying path onto an approaching transport unit if the cell or cells of the transport unit are empty and not reserved or booked by a downstream induction station along the same side of the conveying path. Also, where there are more than one set of induction stations, the system control may be operable to leave a number of free cells or transport units between loaded cells at each induction station which is equal to the number of downstream induction stations along the same side of the conveying path, in order to avoid a back-up condition at the downstream induction stations, as discussed above with respect to processes 100 and 300. The process or algorithm 500 is most suitable for applications where the item or article barcode or identification label is read by a scanner at the induction station and where there are no restrictions regarding recirculation and sending items into a reinduction station or reject chute. This algorithm optimizes balancing of the induction station loading and provides optimal system throughput for the articles at induction stations on both sides of the conveying path.

Process 500 starts at 505 and identifies the destination of an article (article A) at an induction station (induction station A) on the A side of the conveying path at 510 and identifies the destination of an article (article B) at an induction station (induction station B) on the B side of the conveying path at 515. It is then determined at 520 whether an approaching transport unit or cells of the transport unit are available. If it is determined at 520 that none of the cells are available for loading an article thereon, then process 500 continues at 525 and determines if the next transport unit is available. If, on the other hand, it is determined at 520 that a transport unit is available or cells of the transport unit are available, then it is determined at 530 whether the destination of article A at induction station A is along the A side of the conveying path. If it is determined at 530 that the destination of the article A is on the A side of the conveying path, then it is further determined at 535 whether the destination of the article B is at the B side of the conveying path. If it is determined at 535 that the destination of article B is at the B side of the conveying path, such that the articles from each induction station are inducted and discharged at their respective sides of the conveying path, then process 500 loads the articles onto the respective cells of the transport unit at 540, and unloads the articles at the respective discharge chutes at 545. Process 500 then continues at 550 by returning to start at 505 and identifying the destinations of articles at the induction stations.

If it is determined at 535 that the destination of article B is at the A side of the conveying path, such that there is a partial blocking situation between article A and B, because both articles are to be unloaded at the same side, then it is further determined at 555 whether the destination or discharge chute for article B is downstream of the destination or discharge chute for article A. If it is determined at 555 that the discharge chute for article B is downstream from the discharge chute for article A, then process 500 loads the articles onto the respective cells of the transport unit at 560 and unloads article A at its appropriate discharge chute at 565. Article B is then moved across the transport unit onto the cell at the A side of the transport unit at 570 and unloaded at 575 at its appropriate discharge chute. No recirculation arises for article B, since article B is unloaded during the same pass or lap at which it is loaded onto the transport unit. Process 500 then continues at 580 by returning to start at 505.

If, on the other hand, it is determined at 555 that the destination of article B is not downstream of the discharge chute for article A, then it is further determined at 585 whether a reinduction station at side A is present and operable and whether the number of articles or items off loaded onto the reinduction station within a predetermined period of time, such as within the previous five minutes, is lower than a pre-selected threshold value. The threshold value is selected to limit excessive use of the reinduction station, in order to avoid over use and to prevent a back up or pile up condition at the reinduction station or station. If it is determined at 585 that the reinduction station on side A is operable and the numbers of articles loaded onto the reinduction station are below the threshold amount, then the articles A and B are loaded onto the respective cells of the transport unit at 590. Article A is unloaded into the reinduction station at side A of the conveying path at 595. Process 500 then returns to 570, where article B is moved to the opposite or side A cell of the transport unit and unloaded at its appropriate discharge chute, as discussed above.

If it is determined at 585 that the reinduction station A is not operable or the items inducted onto the reinduction station A are not less than the threshold value, then it is further determined at 600 whether the number of items recirculated around the conveying path within the previous period of time is less than a threshold value, such as a predetermined allowable number of recirculated articles within a set time period of operation. This is determined in order to limit the number of articles that are recirculated around the conveying path. If it is determined at 600 that the number of recirculated items is less than the threshold value, then process 500 returns to 560, and proceeds to load and unload the articles onto and off from the respective cells of the transport unit, as discussed above. The article B will then be unloaded at its appropriate chute at 575 during the next lap of the transport unit around the conveying path.

If it is determined at 600 that the number of recirculated items is not less than the threshold value, then it is further determined at 605 whether an induction priority counter value for induction station A is greater than an induction priority counter value for induction station B. As discussed above, the induction priority counter values are incremented each time an article is unable to be loaded by an induction station and is reset each time an article is loaded by the induction station. If it is determined at 605 that the induction priority counter for induction station A is greater than the induction priority counter for induction station B, then article A from induction station A is loaded at 610 onto its appropriate cell of the transport unit. The induction priority counter for induction station B is then incremented at 615. Article A is unloaded at it appropriate discharge chute at 620 and process 500 continues at 625 by returning to start.

If it is determined at 605 that the induction priority counter for induction station A is not greater than the induction priority counter for induction station B, then it is further determined at 630 whether the induction priority counter for induction station A is equal to the induction priority counter for induction station B. If it is determined at 630 that the induction priority counters are equal, then it is further determined at 635 whether a last minute throughput value for induction station A is less than a last minute throughput value for induction station B. If it is determined at 635 that the last minute throughput value for induction station A is less than the last minute throughput value for B, then process 500 returns to 610 and proceeds to load article A onto the respective cell of the transport unit and proceed as discussed above. If, on the other hand, it is determined at 635 that the last minute throughput value for induction station A is not less than the last minute throughput value for induction station B, then neither article is loaded onto the transport unit and process 500 continues at 640. Similarly, if it is determined at 630 that the induction priority counter B is not equal to the induction priority counter A, then neither article is loaded onto the transport unit and process 500 continues at 640, and the induction priority counters for both induction stations are incremented.

If it is determined at 530 that the destination of the article A at induction station A is not on the A side of the conveying path, then it is further determined at 645 whether the destination of the article B on induction station B is at the B side of the conveying path. If it is determined that the article B destination is at the B side of the conveying path at 645, such that there is a partial blocking situation between articles A and B, then process 500 is operable in a similar manner as discussed above with respect to the partial blocking scenario where both articles were to be discharged at the A side of the conveying path, except with the sides reversed. More particularly, if both articles are to be discharged at the B side of the conveying path, it is determined at 650 whether the destination or discharge chute for article A is downstream from the destination or discharge chute for article B. If the discharge chute for article A is downstream from the discharge chute for article B, then the articles A and B are loaded at 655 onto the respective cells of the transport unit. Article B is then unloaded at its discharge chute at 660. Article A is then moved across the transport unit to the cell on the B side of the transport unit at 665 and unloaded at its appropriate discharge chute at 670. Because the discharge chute for article A is downstream of the discharge chute for article B, article A is unloaded during the same lap or pass of the transport unit by the discharge chutes. Process 500 then continues at 675 by returning to start.

If, on the other hand, it is determined at 650 that the discharge chute for article A is not downstream of the discharge chute for article B, then it is further determined at 680 whether a reinduction station is available on the B side of the conveying path and whether the number of items inducted onto the reinduction station are below a predetermined threshold value within a predetermined period of time. If the reinduction station B is operable and the number of items loaded onto it are less than the threshold value, then articles A and B are loaded onto their respective cells of the transport unit at 685. Article B is then discharged at the reinduction station B at 690 and the process returns to 665, where article A is moved across the transport unit to the cell on the B side of the transport unit and unloaded at its appropriate discharge station, as discussed above. Process 500 then continues at 675.

If it is determined at 680 that the reinduction station B is not operable or the items offloaded onto the reinduction station B are not less than the threshold value, then it is further determined at 695 whether the number of items recirculated around the conveying path within a previous predetermined period of time is less than a threshold value. If the number of items is less than the threshold value, then process 500 returns to 655 and proceeds to load and unload the articles as discussed above.

If it is determined at 695 that the number of recirculated items is not less than the threshold value, then it is further determined at 705 whether an induction priority counter for induction station B is greater than an induction priority counter for induction station A. If the induction priority counter for induction station B is greater than the induction priority counter for induction station A, then article B is loaded onto its respective cell of the transport unit at 710. The induction priority counter for induction station A is then incremented at 715, while the article B is unloaded at its appropriate discharge chute at 720. Process 500 then continues at 725.

If, on the other hand, it is determined at 705 that the induction priority counter for induction station B is not greater than the induction priority counter for induction station A, then it is further determined at 730 whether the induction priority counters are equal for the two induction stations. If it is determined at 730 that both the of the induction priority counters are equal, then it is further determined at 735 whether a last minute throughput value for induction station B is less than a last minute throughput value for induction station A. If it is determined at 735 that the last minute throughput value for induction station B is less than the last minute throughput value for induction station A, then process 500 returns to 710 to load and unload article B onto its appropriate cell of the transport unit, as discussed above. On the other hand, if it is determined at 735 that the last minute throughput value for induction station B is not less than the last minute throughput value for induction station A, then process 500 does not load either article onto that particular transport unit and continues at 740. The induction priority counters for both induction stations are then incremented, since the stations are unable to load the articles onto an available transport unit. If it is determined at 730 that the induction priority counters are not equal, such that the induction priority counter for induction station A is greater than the induction priority counter for induction station B, then neither article is loaded onto the transport unit and the process continues at 740. Again, the induction priority counters for both induction stations A and B are incremented, since neither station loads its respective article onto an available transport unit.

On the other hand, if it is determined at 645 that the destination of article B at induction station B is not along the B side of the conveying path, then a full blocking condition exists, where both of the articles are to be offloaded at the opposite side of the conveying path from their respective induction stations. It is then further determined at 745 whether a reinduction station A on side A of the conveying path is present and operable and whether the number of items offloaded onto the reinduction station A is less than a predetermined threshold value within the previous predetermined period of time. If the reinduction station A is operable and the number of items offloaded onto the reinduction station is less than the threshold value, then process 500 returns to 590 to load and unload the articles using reinduction station A, as discussed above. If, on the other hand, it is determined at 745 that either the reinduction station A is not operable or the number of items offloaded onto the reinduction station A is not less than the threshold value, then it is further determined at 750 whether a reinduction station B along the B side of the conveying path is present and/or operable and whether the number of items offloaded onto the reinduction station B is less than the threshold value. If the reinduction station B is operable and the number of items offloaded onto the reinduction station B is below the threshold value, then process 500 returns to 685 to load and unload the articles onto the respective cells of the transport unit and the respective discharge chute and reinduction station B, as discussed above.

If it is determined at 750 that either the reinduction station B is not operable or the number of items offloaded onto the reinduction station B is not below the threshold value, then it is further determined at 755 whether the number of items recirculated around the conveying path within a previous predetermined period of time is below a threshold value. If the number of recirculated items is below the threshold value at 755, then process 500 loads articles A and B onto their respective cells of the transport unit at 760 and unloads article A into a reject chute A at 765. Process 500 then returns to 570, where article B is moved to the A side of the transport unit and unloaded at the appropriate discharge chute along side A during the next pass or lap of the transport unit around the conveying path, as discussed above. If the number of recirculated items is not below the threshold value at 755, then it is further determined at 770 whether an induction priority counter for induction station A is greater than an induction priority counter for induction station B. If the induction priority counter for induction station A is greater than the induction priority counter for induction station B, then process 500 loads article A onto its respective cell of the transport unit at 775 and increments the induction priority counter for induction station B at 780. Article A is then moved across the transport unit and unloaded at its respective destination at 785 and process 500 continues at 790. If it is determined at 770 that the induction priority counter for induction station A is not greater than the induction priority counter for induction station B, then it is further determined at 795 whether the induction priority counter for induction station B is greater than the induction priority counter for induction station A. If the induction priority counter for induction station B is greater than the induction priority counter for induction station A, then process 500 proceeds to load article B onto the transport unit at 800 and increment the induction priority counter for induction station A at 805. Article B is then moved across the transport unit and unloaded at its respective destination at 810 and process 500 continues at 815.

If it is determined at 795 that the induction priority counter for induction station B is not greater than the induction priority counter for induction station A, such that the induction priority counters for the two induction stations are equal, then it is further determined at 820 whether a last minute throughput value for induction station A is less than a last minute throughput value for induction station B. If the last minute throughput value for induction station A is less than the last minute throughput value for induction station B, then process 500 returns to 775 and proceeds to load and unload article A, while incrementing the induction priority counter for induction station B, as discussed above. If the last minute throughput value for induction station A is not less than the last minute throughput value for induction station B, then it is further determined at 825 whether the last minute throughput value for induction station B is less than the last minute throughput value for induction station A. If the last minute throughput value for induction station B is less than the last minute throughput value for induction station A, then process 500 returns to 800 and proceeds to load and unload article B on the transport unit, while incrementing the induction priority counter A at induction station A, as discussed above. Furthermore, if the last minute throughput values for the induction stations are equal, then process 500 does not load either of the articles on that particular transport unit and continues at 830. The induction priority counters for both induction stations are then incremented by the sortation system controls.

Accordingly, process 500 is operable to determine whether an article at an induction station on either side of the conveying path or articles at induction stations on both sides of the conveying path will be loaded onto one or both cells of an available and approaching transport unit. The decision process optimizes throughput of the articles while limiting offloading of the articles into reject chutes and/or offloading of the articles into reinduction stations. The process also attempts to minimize loading of articles onto a transport unit that will result in recirculation of one of the articles, where one of the articles is transported entirely around the conveying path before it is unloaded in a subsequent pass by the discharge chutes.

Each of the processes described above may be simultaneously and continuously performed for each induction station or corresponding pairs of induction stations along one or both sides of the conveying path of the sortation system. The status of each transport unit is reviewed to determine if the transport unit is capable of receiving a package from the next induction station or stations, while the induction stations simultaneously determine the destination of the next package, in order to determine whether the package may be inducted onto the approaching transport unit. The present invention thus provides improved throughput by having the ability to place two packages on each transport unit, whereby both packages may be discharged to the same side of the conveying path or each package may be discharged to opposite sides of the conveying path, without requiring any presortation of the packages prior to placing the packages on the induction stations.

Although shown and described as a process for each induction station which determines whether the particular cells of the approaching transport unit are already booked by any other induction station, it is further envisioned that the controls of the present invention may further analyze and compare the size and destination of the articles on multiple induction stations to further optimize which of two or more articles at two or more induction stations will be placed on an available cell or carrier belt of a transport unit, thereby further optimizing the sortation system of the present invention. Although not included in the flow charts of FIGS. 6–8, if the article at the induction station is too large to be placed on a single belt or cell of the transport unit, the process is further operable to book two adjacent cells, or four contiguous cells arranged in a square, for that article. The oversized article may then be loaded onto the adjacent cells using the principles disclosed in U.S. Pat. No. 5,588,520.

Therefore, the present invention provides a sortation system which provides improved throughput, without requiring pre-sequencing of the items to the correct side of the sorter or conveyor path. The items may be inducted onto a cell or carrier belt of a transport unit and transferred over to the other side of the transport unit if necessary. This allows an induction station to then induct an item onto the now vacant cell on the initial side of the transport unit. The processes of the present invention function to optimize throughput of the sortation system and may limit use of reject chutes, depending on the application and/or desired mode or result of the sortation system.

Because the present invention is operable to perform a functional equivalent of a presort of the packages as the packages are inducted onto the transport units, the present invention provides substantially improved throughput rates, with greatly reduced manual intervention required. The present invention provides for a control-based pre-sequencing of the packages, and allows for two packages to be loaded onto and carried by a single transport unit, thereby substantially increasing the number of items per hour that can be transported from a given induction station or stations to the appropriate chute destination. The sortation system effectively pre-sequences the items to the correct side of the transport unit, and thus is capable of achieving substantially the same throughput as a presorted single carrier or crossbelt system. It is further envisioned that if the packages are presorted at the induction stations, then the sortation system may provide additional benefit over the presorted systems of the prior art.

Additionally, because the sortation system of the present invention is capable of providing significantly improved throughput, the sortation system may accommodate induction stations which are operable at a higher induction rate than existing induction stations. For example, an existing induction station may have a throughput limit of approximately 3300 items per hour, while a high rate induction system may be operable with the present invention to induct approximately 6000 items per hour, thereby further enhancing the throughput of the present invention. Optionally, the induction stations or systems used with the present invention may be of the type disclosed in commonly assigned, co-pending U.S. patent application Ser. No. 09/669,170, entitled HIGH RATE INDUCTION SYSTEM, filed Sept. 25, 2000 by Affaticati et al., now U.S. Pat. No. 6,513,641, which is hereby incorporated herein by reference.

Accordingly, the present invention is operable to provide improved throughput capabilities over the prior art, without complex presortation of the packages, such that the packages may be fed to the individual induction units irrespective of the destinations of the articles. The processes may be selected for a particular application, such as for a blind loading application or presorting/sequencing application, or to achieve a desired result, such as optimal throughput, minimal recirculation, or avoidance of reinduction or reject chutes. Although the present invention is operable to optimize sortation and throughput of articles at induction stations at the same or at opposite sides of the conveying path, the side by side cells or carrier belts of the transport units may also be operable to handle a large range of sizes and weights of packages by utilizing two or more cells or carrier belts which are operable in either a synchronized or concurrent manner. The sortation system is thus able to orient large products onto both cells of one transport unit or onto the cells of two adjacent transport units to accommodate oversized products.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A method for induction of articles onto one or more of a plurality of transport units having side by side article support capability, the transport units being movable along a continuous conveying path, said method comprising:
   providing at least one induct for loading articles onto the transport units;
   feeding articles to said at least one induct without respect to a destination of the articles and moving articles along said at least one induct toward the transport units in the order in which the articles were fed to said at least one induct, the articles including blocked articles that are arranged on the induct in a manner that will cause at least a partial blocking condition;
   determining a destination of the articles at said at least one induct;
   loading the articles from said at least one induct to the transport units, the articles including blocked articles on a respective induct being loaded to the transport units in the order in which the articles are fed to said respective induct; and
   resolving at least partial blocking conditions between the articles, said at least partial blocking conditions comprising an interference between two articles based on the destination of the two articles and the side of the conveying path or transport unit at which the two articles are positioned.

2. The method of claim 1 further including providing at least two discharge ports at opposite sides of the conveying path for receiving articles at their destinations.

3. The method of claim 1 including resolving said at least partial blocking conditions by loading articles as a function of the destination and said blocking conditions of the articles to limit unloading of either of the articles remote from their respective destination.

4. The method of claim 1 including resolving said blocking conditions by loading articles as a function of the destinations of the articles and said blocking conditions to limit recirculation of articles around the conveying path.

5. The method of claim 1 including determining a recirculation status of the system and resolving said blocking conditions as a function of the recirculation status.

6. The method of claim 1 including determining an upstream destination of the respective destinations for first and second articles and resolving said blocking conditions between the first and second articles as a function of the upstream destination.

7. The method of claim 1, wherein the transport units include side by side article supports which are independently operable to load, unload or transfer articles.

8. The method of claim 7, wherein the article supports comprise side by side carrier belts at each of the transport units.

9. A method for induction of articles onto one or more of a plurality of transport units having side by side article support capability, the transport units being movable along a continuous conveying path, said method comprising:
   providing at least one induct for loading articles onto the transport units, wherein providing at least one induct includes providing at least two inducts for loading articles onto the transport units from opposite sides of the conveying path;
   feeding articles to said at least one induct without respect to a destination of the articles and moving articles along said at least one induct toward the transport units in the order in which the articles were fed to said at least one induct;
   determining a destination of articles at said at least one induct;
   loading articles from said at least one induct to the transport units; and
   resolving at least partial blocking conditions between the articles, said at least partial blocking conditions comprising an interference between two articles based on the destination of the two articles and the side of the conveying path or transport unit at which the two articles are positioned.

10. The method of clam 9, wherein, in response to a full blocking condition, whereby the destinations of two articles are at opposite sides of the conveying path from the respective inducts of the articles, said method includes:
    determining an induction priority for each of said inducts of the articles; and
    resolving the full blocking condition by loading one of the articles and delay loading of the other of the articles as a function of the induction priority of said inducts.

11. The method of claim 10 including:
    determining a last minute throughput value for each of said inducts in response to the induction priorities for said inducts being equal; and
    resolving said full blocking condition by loading one of the articles as a function of the induction priority and the last minute throughput value of the inducts.

12. The method of claim 9 including:
    providing at least one reinduction station along at least one side of the conveying path, said at least one reinduction station being operable to receive articles from said transport units and to reinduct articles onto said transport units.

13. The method of claim 12, wherein resolving blocking conditions includes resolving said blocking conditions by unloading articles loaded onto a transport unit to said at least one reinduction station and reloading articles from said at least one reinduction station onto a transport unit as a function of the blocking condition and destination of articles loaded onto said transport unit.

14. The method of claim 12 including providing at least one reinduction station downstream from said at least one induct and upstream of the destinations of the articles, said method including resolving said blocking conditions as a function of the destinations of the articles and an availability of said at least one reinduction station.

15. The method of claim 14 including:
    loading articles onto both sides of a respective one of the transport units; and
    resolving said blocking conditions by unloading one of the articles from one side of the transport unit at said at least one reinduction station in response to a full or partial blocking condition between the articles.

16. A method for induction of articles onto one or more of a plurality of transport units having side by side article support capability, the transport units being movable along a continuous conveying path, said method comprising:
    providing at least two inducts for loading articles onto the transport units;
    feeding articles to said at least two inducts without respect to a destination of the articles and moving articles along said at least two inducts toward the transport units in the order in which the articles were fed to said at least two inducts, the articles including articles that are arranged on the inducts in a manner that will cause at least a partial blocking condition;
    determining a destination of the articles at each of said at least two inducts; and
    loading the articles from said at least two inducts to the transport units in a manner that avoids at least partial blocking conditions between the articles, the articles being loaded from a respective one of said inducts in the order in which the articles are fed to the respective one of said at least two inducts, said at least partial blocking conditions comprising an interference between two articles based on the destination of the two articles and the side of the conveying path or transport unit at which the two articles are positioned.

17. The method of claim 16, wherein loading articles includes loading and delay loading articles onto the transport units.

18. The method of claim 17, wherein loading and delay loading of articles includes loading and delay loading of articles as a function of an induction priority status of said at least two inducts.

19. The method of claim 16 including providing at least one reinduction station downstream from said at least two inducts and upstream of the destinations of the articles, said method including resolving said blocking conditions as a function of the destinations of the articles and an availability of said at least one reinduction station.

20. The method of claim 19 including:
    loading articles onto both sides of a respective one of the transport units; and
    resolving said blocking conditions by unloading one of the articles from one side of the transport unit at said at least one reinduction station in response to a full or partial blocking condition between the articles.

21. The method of claim 16 including determining a recirculation status of the system and resolving said blocking conditions as a function of the recirculation status.

22. The method of claim 16, wherein the transport units include side by side article supports which are independently operable to load, unload or transfer articles.

23. The method of claim 22, wherein the article supports comprise side by side carrier belts at each of the transport units.

24. A method for induction of articles onto one or more of a plurality of transport units having side by side article support capability, the transport units being movable along a continuous conveying path, said method comprising:
    providing at least two inducts for loading articles onto the transport units, wherein providing at least two inducts includes providing at least one induct for loading articles onto the transport units at each side of the conveying path;
    feeding articles to said at least two inducts without respect to a destination of the articles and moving articles along said at least two inducts toward the transport units in the order in which the articles were fed to said at least two inducts;
    determining a destination of articles at each of said at least two inducts;
    loading articles from said at least two inducts to the transport units in a manner that avoids at least partial blocking conditions between the articles, said at least partial blocking conditions comprising an interference between two articles based on the destination of the two articles and the side of the conveying path or transport unit at which the two articles are positioned.

25. The method of claim 24 including providing at least two discharge stations at opposite sides of the conveying path for unloading articles from the transport units.

* * * * *